(12) United States Patent
Zhai et al.

(10) Patent No.: US 12,189,816 B2
(45) Date of Patent: Jan. 7, 2025

(54) AUTOMATED TEST REPLAY WITH SENSITIVE INFORMATION OBFUSCATION

(71) Applicant: MICRO FOCUS LLC, Santa Clara, CA (US)

(72) Inventors: Hua-Ming Zhai, Shanghai (CN); Bo Tian, Shanghai (CN); Er-Xin Shang, Shanghai (CN); Chu Jun Dong, Shanghai (CN)

(73) Assignee: Micro Focus LLC, Plano, TX (US)

( * ) Notice: Subject to any disclaimer, the term of this patent is extended or adjusted under 35 U.S.C. 154(b) by 183 days.

(21) Appl. No.: 17/617,810

(22) PCT Filed: Jul. 10, 2019

(86) PCT No.: PCT/CN2019/095413
§ 371 (c)(1),
(2) Date: Dec. 9, 2021

(87) PCT Pub. No.: WO2021/003697
PCT Pub. Date: Jan. 14, 2021

(65) Prior Publication Data
US 2022/0229764 A1    Jul. 21, 2022

(51) Int. Cl.
*G06F 9/44* (2018.01)
*G06F 9/445* (2018.01)
(Continued)

(52) U.S. Cl.
CPC ...... *G06F 21/6254* (2013.01); *G06F 11/3676* (2013.01); *G06F 11/3688* (2013.01);
(Continued)

(58) Field of Classification Search
CPC ............... G06F 21/6254; G06F 18/214; G06F 11/3637; G06F 11/3688; G06F 11/3692;
(Continued)

(56) References Cited

U.S. PATENT DOCUMENTS

| | | |
|---|---|---|
| 6,724,946 B1 | 4/2004 | Kusama |
| 7,917,770 B2 | 3/2011 | Gopinath |

(Continued)

FOREIGN PATENT DOCUMENTS

| | | |
|---|---|---|
| CN | 104408686 A | 3/2015 |
| CN | 107145800 A | 9/2017 |

(Continued)

OTHER PUBLICATIONS

Chien-Hung Liu, Capture-Replay Testing for Android Applications, 2014, pp. 1-4. https://ieeexplore.ieee.org/stamp/stamp.jsp?tp=&arnumber=6846085 (Year: 2014).*

(Continued)

*Primary Examiner* — Mongbao Nguyen
(74) *Attorney, Agent, or Firm* — Sheridan Ross P.C.

(57) ABSTRACT

According to examples, an apparatus may include a processor that may identify sensitive information in a recording of an automated test script that is replayed to automatically test a graphical user interface (GUI) of an application under test (AUT). The apparatus may identify the sensitive information during the recording such that sensitive information is identified as the automated test is recorded or afterward based on an analysis of the recording. as based on user input that identifies the sensitive information (or areas containing the sensitive information), automated text analysis, or automated image analysis such as machine-learning based object detection. Once sensitive information (or area) is identified, the apparatus may generate and apply a mosaic to obscure the sensitive information (or area).

20 Claims, 7 Drawing Sheets

(51) Int. Cl.
*G06F 9/455* (2018.01)
*G06F 11/36* (2006.01)
*G06F 18/214* (2023.01)
*G06F 21/62* (2013.01)
*G06N 20/00* (2019.01)
*G06V 20/52* (2022.01)
*G06V 20/62* (2022.01)
*G06V 30/10* (2022.01)

(52) U.S. Cl.
CPC ........ *G06F 11/3692* (2013.01); *G06F 18/214* (2023.01); *G06N 20/00* (2019.01); *G06V 20/52* (2022.01); *G06V 20/62* (2022.01); *G06V 30/10* (2022.01)

(58) Field of Classification Search
CPC ........ G06N 20/00; G06V 20/52; G06V 20/62; G06V 30/10
See application file for complete search history.

(56) References Cited

U.S. PATENT DOCUMENTS

| | | | |
|---|---|---|---|
| 9,298,598 B2 | 3/2016 | Fryc | |
| 9,501,657 B2 | 11/2016 | Wu | |
| 9,986,290 B2 | 5/2018 | Ayers | |
| 10,204,030 B1* | 2/2019 | Hockett | G06F 11/3636 |
| 11,137,871 B2* | 10/2021 | Duneau | G06F 3/04845 |
| 2011/0131551 A1* | 6/2011 | Amichai | G06F 11/3668 717/125 |
| 2011/0191676 A1* | 8/2011 | Guttman | G06F 11/3688 715/768 |
| 2014/0074452 A1* | 3/2014 | Carmi | G06F 8/10 703/22 |
| 2015/0339213 A1* | 11/2015 | Lee | G06F 3/0484 717/125 |
| 2016/0119672 A1* | 4/2016 | Alonso | H04N 21/4728 725/19 |
| 2018/0060222 A1* | 3/2018 | Kogan | G06F 11/3692 |
| 2018/0129586 A1 | 5/2018 | Gillaspie | |
| 2018/0268240 A1 | 9/2018 | Loce | |
| 2018/0336122 A1* | 11/2018 | Kogan | G06F 11/3672 |
| 2019/0087691 A1* | 3/2019 | Jelveh | G06N 3/084 |
| 2019/0303178 A1* | 10/2019 | Mastracci | G06F 8/77 |
| 2019/0384699 A1* | 12/2019 | Arbon | G06N 3/006 |
| 2020/0104244 A1* | 4/2020 | Christen | G06F 11/3664 |
| 2020/0151617 A1* | 5/2020 | Chauhan | H04L 67/535 |
| 2020/0159644 A1* | 5/2020 | Beltran | G06F 11/3476 |
| 2020/0306638 A1* | 10/2020 | Fear | A63F 13/56 |
| 2020/0356469 A1* | 11/2020 | Gupta | G06F 3/0484 |
| 2020/0380160 A1* | 12/2020 | Kraus | G06F 21/577 |

FOREIGN PATENT DOCUMENTS

| | | | | |
|---|---|---|---|---|
| CN | 107330848 A | 11/2017 | | |
| CN | 108038396 A | 5/2018 | | |
| CN | 108491729 A | 9/2018 | | |
| CN | 109145248 A | * 1/2019 | ......... | G06F 11/3438 |
| CN | 109359043 A | 2/2019 | | |
| KR | 101936802 | 1/2019 | | |

OTHER PUBLICATIONS

Richard Mcpherson, Defeating Image Obfuscation with Deep Learning, 2016, pp. 1-4. chrome-extension://efaidnbmnnnibpcajpcglclefindmkaj/https://arxiv.org/pdf/1609.00408.pdf (Year: 2014).*

Mattia Fazzini, From Manual Android Tests to Automated and Platform Independent Test Scripts, 2016, pp. 1-10. chrome-extension://efaidnbmnnnibpcajpcglclefindmkaj/https://arxiv.org/pdf/1608.03624 (Year: 2016).*

Jonathan A. Saddler, EventFlowSlicer: A Tool for Generating Realistic Goal-Driven GUI Tests, 2017, pp. 1-6. https://ieeexplore.ieee.org/stamp/stamp.jsp?tp=&arnumber=8115711 (Year: 2017).*

English translation, Bekmambetov (CN 109145248 A), pp. 1-19, 2019. (Year: 2019).*

Author Unknown: Open CV; "Draw a Blurring Rectangle"; https://answers.opencv.org/question/71102/draw-a-blurring-rectangle/; May 7, 2019; 3 pages.

Shalini Gupta: Software Testing Strategy for Protection of Real Data; https://www.computerweekly.com/tip/Software-testing-strategy-for-protection-of-real-data; May 7, 2019; 4 pages.

* cited by examiner

300C

300D

400

```
┌─────────────────────────────────────────────────────────┐
│ TRAIN A MACHINE LEARNING (ML) MODEL TO RECOGNIZE AREAS OF│
│   DISPLAY SPACES THAT INCLUDE SENSITIVE INFORMATION      │
│                          402                             │
└─────────────────────────────────────────────────────────┘
                            │
                            ▼
┌─────────────────────────────────────────────────────────┐
│ REPLAY AN AUTOMATED TEST SCRIPT THAT RECORDED A TEST OF A│
│       GRAPHICAL USER INTERFACE (GUI) ON A DISPLAY SPACE  │
│                          404                             │
└─────────────────────────────────────────────────────────┘
                            │
                            ▼
┌─────────────────────────────────────────────────────────┐
│ IDENTIFY, DURING THE REPLAY, AN AREA OF THE DISPLAY SPACE│
│   THAT INCLUDES THE SENSITIVE INFORMATION BASED ON THE   │
│                         ML MODEL                         │
│                          406                             │
└─────────────────────────────────────────────────────────┘
                            │
                            ▼
┌─────────────────────────────────────────────────────────┐
│ GENERATE A SNAPSHOT THAT INCLUDES A VISUAL OF THE DISPLAY│
│                          SPACE                           │
│                          408                             │
└─────────────────────────────────────────────────────────┘
                            │
                            ▼
┌─────────────────────────────────────────────────────────┐
│ APPLY A MOSAIC TO THE SNAPSHOT BASED ON THE AREA OF THE  │
│  DISPLAY SPACE THAT INCLUDES THE SENSITIVE INFORMATION   │
│                          410                             │
└─────────────────────────────────────────────────────────┘
```

*FIG. 4*

AUTOMATED TEST REPLAY WITH SENSITIVE INFORMATION OBFUSCATION

BACKGROUND

An application testing system may include a recorder that may record test usage of a graphical user interface (GUI) generated by an application under test (AUT). For example, the recorder may store an indication of a user input at the GUI in an automated test script. The application testing system may include a replay component that replays the automated test script to recreate the recorded test usage. For example, the replay component may determine the location of the user input on the GUI based on the automated test script. Thus, the application testing system may automatically recreate the recorded test usage based on a replay of the automated test script.

BRIEF DESCRIPTION OF THE DRAWINGS

Features of the present disclosure may be illustrated by way of example and not limited in the following figure(s), in which like numerals indicate like elements, in which:

FIG. 4 depicts a flow diagram of an example method for identifying sensitive information in a snapshot of a replay of an automated test of a GUI and applying a mosaic to the snapshot to obfuscate the sensitive information.

DETAILED DESCRIPTION

Figure 1:
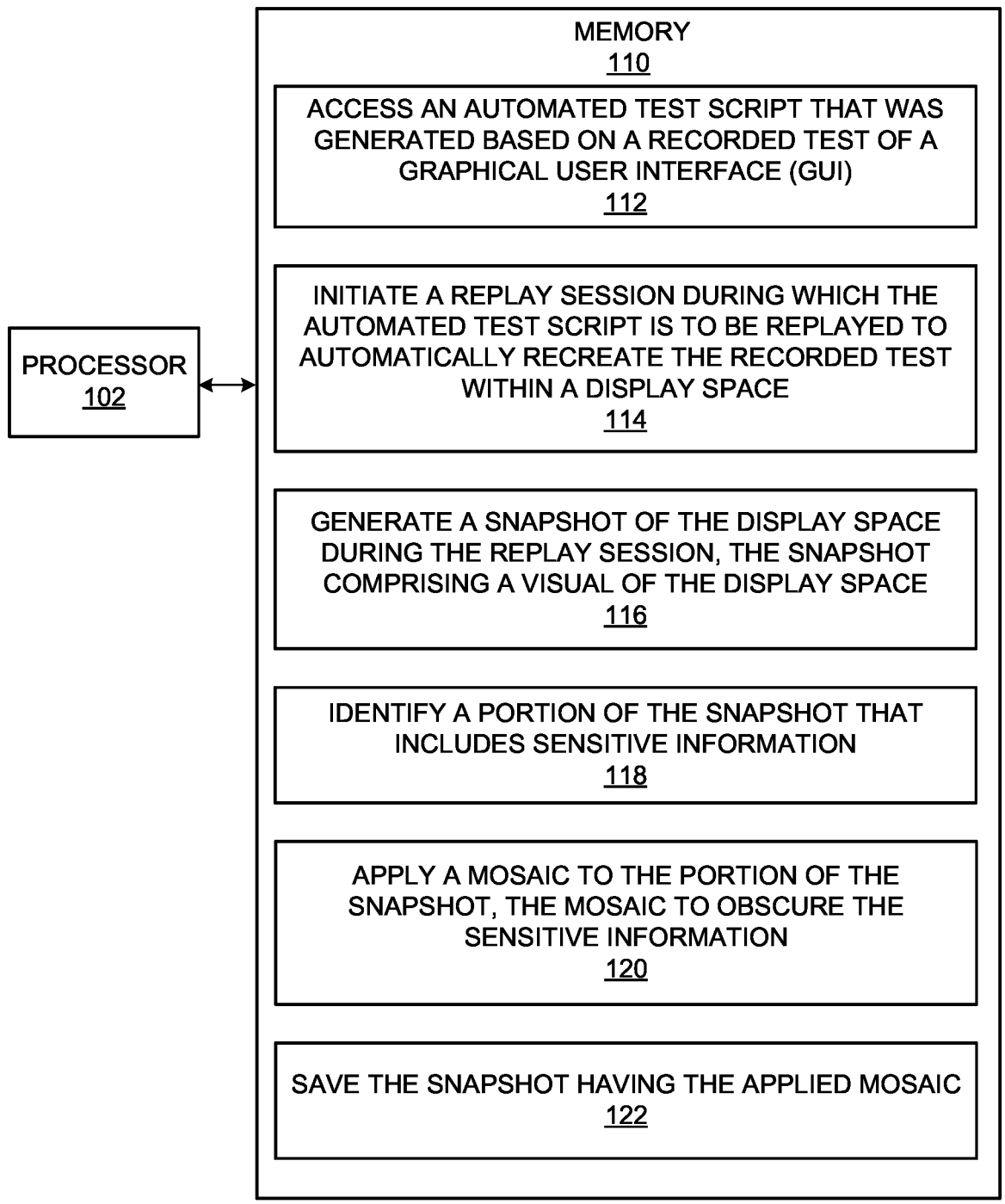
FIG. 1 shows a block diagram of an example apparatus that may obfuscate sensitive information in a graphical user interface (GUI) while recording test usage of the GUI of an application under test (AUT)

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Automated testing may determine whether changes to an AUT and/or GUI have affected GUI or other application functionality. Automated test scripts—together with computer vision techniques to identify GUI elements during replay—may facilitate efficient testing of AUTs without having to have knowledge of the underlying GUI or AUT code. An automated testing system may record a snapshot that includes a visual (such as a video or still image) of the replay during the replay session. The recorded snapshot may maintain a record of the replay (the automated test).

However, in many instances, sensitive information may be present in a display space on which the GUI is presented. In these instances, the recorded snapshot may inadvertently include the sensitive information. The sensitive information may be information that a user making the recording does not wish to be included in the snapshot. For example, the sensitive information may include personal information, confidential information, and/or other information a user does not wish to be included in the snapshot. It should be noted that the sensitive information may include text, images, videos, and/or other object that may be visually displayed on the display space (such as an electronic display). The GUI itself may include sensitive information and/or other objects of the display space may include the sensitive information. It should noted that the sensitive information may occupy an area of the display space. Such area may be referred to herein as a "sensitive area."

To address the foregoing problems relating to automated testing of a GUI, an apparatus may identify and obscure the sensitive information. The apparatus may identify the sensitive information during or after the recording. The apparatus may identify the sensitive information in various ways. For example, the apparatus may identify the sensitive information based on a user input that: identifies an area of the display space (or snapshot) to be obfuscated, identifies a GUI control to be obfuscated, and/or identifies regions not to be obfuscated and to obfuscate all other regions in the display space.

In some examples, the apparatus may automatically identify the sensitive information based on text and/or object recognition. For example, the apparatus may detect text in the display space (or the snapshot) and perform pattern matching with text patterns indicative of sensitive information. In some examples, the apparatus may obtain the text by performing optical analysis such as optical character recognition (OCR) for text contained in images and not presented as clear text in the display space (or snapshot). In some examples, the apparatus may automatically identify the sensitive information by applying machine learning (ML) techniques such as you-only-look-once (YOLO) to train models to detect objects in images that include sensitive information.

In some examples, the apparatus may generate and apply a mosaic to the snapshot so that the sensitive information is obscured. A mosaic may be an electronic alteration to an area of a display space that includes sensitive information to render the sensitive information unreadable or otherwise unrecognizable. Multiple mosaics may be applied as necessary.

Whichever manner or combination of manners is used to identify sensitive information, the apparatus may implement the mosaic in various ways. For example, the apparatus may implement the mosaic by removing pixels associated with the sensitive information, overlaying a screen element (such as an opaque window) onto the sensitive information, encrypting text of the sensitive information, modifying the sensitive information so that the sensitive information is unreadable or unrecognizable, overlaying display elements onto the sensitive areas, and/or modifying pixels through various image processing libraries, such as the OpenCV library available from opencv [dot] [org], the contents of which are incorporated by reference in its entirety herein.

It should be noted that the apparatus may apply the mosaic before, during or after the snapshot is recorded. For example, before or during the recoding, the apparatus may analyze the display space to identify sensitive information and apply the mosaic to the sensitive information on the display space so that the recorded snapshot already includes the mosaic. Alternatively, after the recording, the apparatus may analyze the snapshot to identify sensitive information and apply the mosaic to the sensitive information on the snapshot after the recording.

Figure 2:
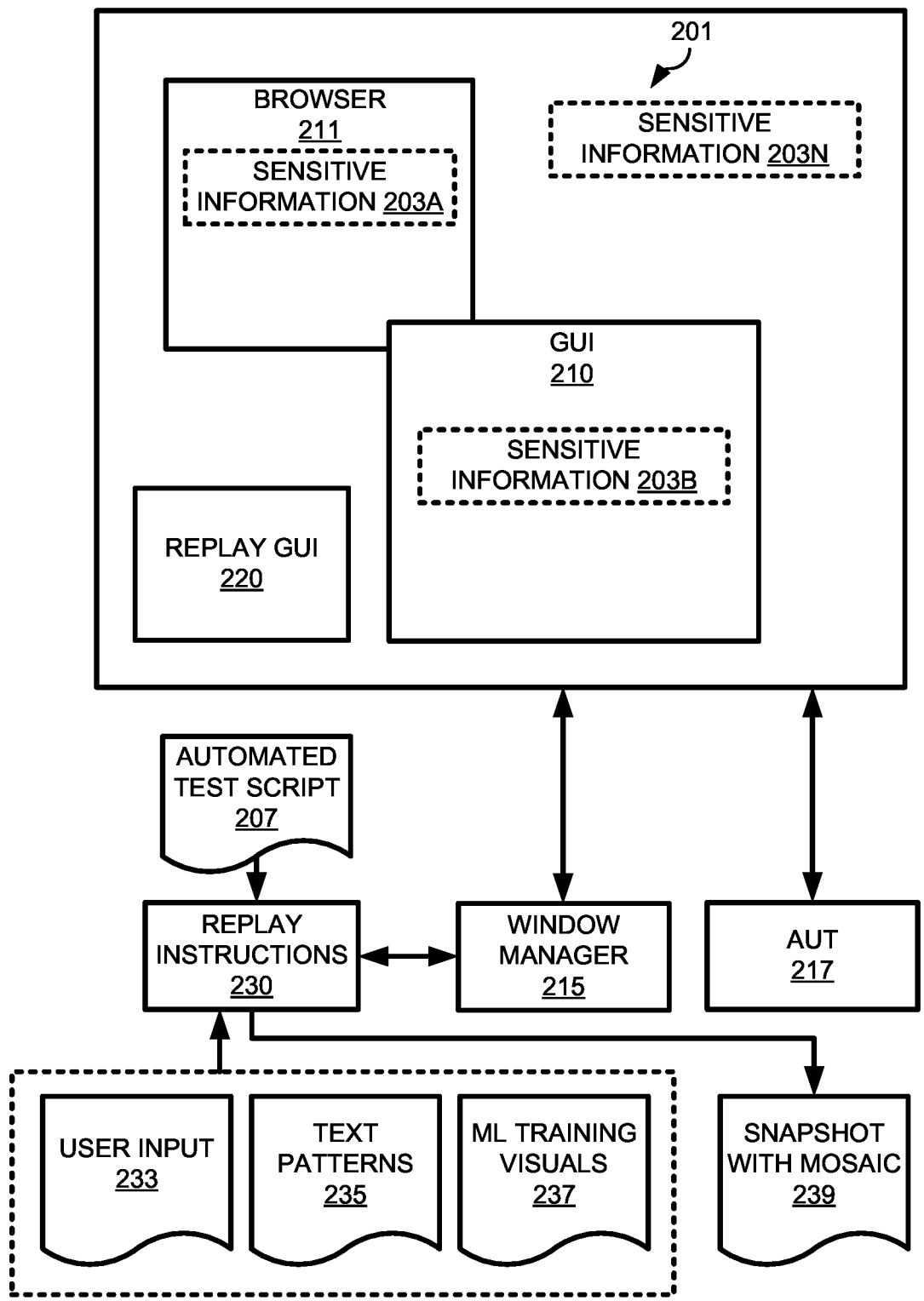
FIG. 2 shows an example of identifying portions of a snapshot that includes sensitive information displayed on a display space.

FIG. 1 shows a block diagram of an example apparatus 100 that may obfuscate sensitive information in a graphical user interface (GUI), such as GUI 210 illustrated in FIG. 2, while recording test usage of the GUI an application under test (AUT), such as AUT 217 illustrated in FIG. 2. It should be understood that the example apparatus 100 depicted in FIG. 1 may include additional features and that some of the features described herein may be removed and/or modified without departing from any of the scopes of the example apparatus 100.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-122 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to obfuscate sensitive information in a recorded visual of a replay of an automated test.

Referring to FIG. 1, the processor 102 may fetch, decode, and execute the instructions 112 to access an automated test script (such as the automated test script 207 illustrated in FIG. 2) that was generated based on a recorded test of a graphical user interface (GUI). The automated test script may include instructions for the processor 102 to perform an action recorded by a testing user. Such action may include pressing a button on the GUI or otherwise interacting with the GUI.

The processor 102 may fetch, decode, and execute the instructions 114 to initiate a replay session during which the automated test script is to be replayed to automatically recreate the recorded test within a display space (such as display space 201 illustrated in FIG. 2). To replay the automated test script, the processor 102 may execute the instructions to perform the action or otherwise recreate the action based on the instructions in the automated test script. The processor 102 may fetch, decode, and execute the instructions 116 to generate a snapshot of the display space during the replay session. The snapshot may include a visual of the display space.

The processor 102 may fetch, decode, and execute the instructions 118 to identify a portion of the snapshot that includes sensitive information. The processor 102 may identify the portion in various ways, which are described in more detail with respect to FIGS. 2 and 3A-E. The processor 102 may fetch, decode, and execute the instructions 120 to apply a mosaic to the portion of the snapshot. The mosaic may obscure the sensitive information by deleting some or all of the sensitive information, modifying some or all some or all of the sensitive information, or otherwise rendering the sensitive information unrecognizable (such as being unable to read text or discern an image). In some examples, the processor 102 may apply the mosaic throughout the duration of the replay session. For example, the mosaic may be applied while the replay of the automated test script is executed. In other examples, the mosaic may be applied after the replay session has ended and the recording of the replay session is analyzed.

The processor 102 may fetch, decode, and execute the instructions 122 to save the snapshot having the applied mosaic. In this manner, the visual in the snapshot may have the sensitive information obfuscated by the mosaic while being retained for test storage and review.

FIG. 2 shows an example of identifying portions of a snapshot that includes sensitive information 203 displayed on a display space 201. The display space 201 may be displayed by a display device, such as a computer display device (not illustrated) or other type of display device such as an augmented reality display device. The display elements displayed in the display space 201 may include a visual object displayed in the display space. For example, the display elements may include a browser 211, the GUI 210 of the AUT 217, a replay GUI 220, desktop icons or application launchers (not illustrated), standalone text, and/or other visual objects. Each display element may include sensitive information 203, illustrated as sensitive information 203A-N. For example, the browser 211 may include sensitive information 203A (which may include a Uniform Resource Locator address or address bar or content displayed in the browser), the GUI 210 may include sensitive information 203B, and other display elements may include other sensitive information 203N. Although not illustrated, the replay GUI 220 itself may include sensitive information as well. Each sensitive information 203 may occupy a display area on the display space 201. The display area is illustrated as a rectangle bounded by a dashed line, although other shapes of the display area may occur depending on the nature and shape of the sensitive information 203. In some examples, the replay instructions may apply a mosaic to the display area, which may be only a part of the display element. For example, the mosaic may be applied only to the URL input box of the browser 211, to the entire browser 211 or portions of the browser 211 not covered by other display elements. In some examples, the replay instructions 230 may apply a mosaic to an entire window of a display element that includes the sensitive information. The replay GUI 220 may include GUI controls for controlling replay operations, including start, stop, record, and/or other operations that may be performed in connection with a replay session.

The replay instructions 230 may cause a processor, such as processor 102 illustrated in FIG. 1, to initiate a replay session during which an automated test of the GUI 210 may be conducted based on the automated test script 207. For example, the replay instructions 230 may be stored at the memory 110 and executed by the processor 102, both of which are illustrated in FIG. 1. It should be noted that the replay instructions 230 may include some or all of the instructions 112-122 illustrated in FIG. 1, instructions that facilitate the operations illustrated in FIGS. 3A-3E, 4 and 5, and/or other instructions.

In some examples, the replay instructions 230 may cause the processor to generate a snapshot that includes a visual of the automated test of the GUI 210. For example, the user may initiate a recording of the snapshot through a record or other button of the replay GUI 220. Alternatively, or additionally, the replay instructions 230 may automatically start the recording once the automated test script 207 is replayed. In some examples, the recording may be stopped by the user or automatically stopped. In some examples, the replay snapshot may record the entire replay session.

The snapshot may record all or a portion of the area of the display space 201. Because the display space 201 (including any of the elements such as the GUI 210 or browser 211, replay GUI 220, or other display elements) may include sensitive information 203, the replay instructions 230 may generate a snapshot with mosaic 239. The snapshot with mosaic 239 may include a mosaic applied to, such as being overlaid onto, the snapshot to render the sensitive information unreadable or otherwise unrecognizable. As used herein, the term "overlaid" and similar terms such as "overlay" and "overlaying" may refer to being layered on top of. In a window display environment, for example, a window manager 215 (which may be provided by an operating system to render the display space 201) may overlay the mosaic on top of the GUI 210 by layering a window corresponding to the mosaic on top of a window corresponding to the GUI 210. The mosaic may be applied to the snapshot in other ways as well, such as by modifying or deleting pixels of the snapshot.

In some examples, the replay instructions 230 may (i.e., may cause the processor to) identify the sensitive information 203 (which may also or instead include identifying any sensitive area that includes the sensitive information) to which to apply the mosaic. For example, the replay instructions 230 may do so based on user input 233, automatically based on text patterns 235, or automatically based on ML image models trained based on ML training visuals 237, as will be described with respect to FIGS. 3A-E.

Various manners in which the apparatus 100 may operate to identify sensitive information 203 to which to apply the mosaic are discussed in greater detail with respect to the methods 300A-300E depicted in FIGS. 3A-3E. It should be understood that the methods 300A-E may each include additional operations and that some of the operations described therein may be removed and/or modified without departing from the scopes of each of the methods 300A-E. The description of each of the methods 300A-E may be made with reference to the features depicted in FIGS. 1 and 2 for purposes of illustration.

Figure 3A:
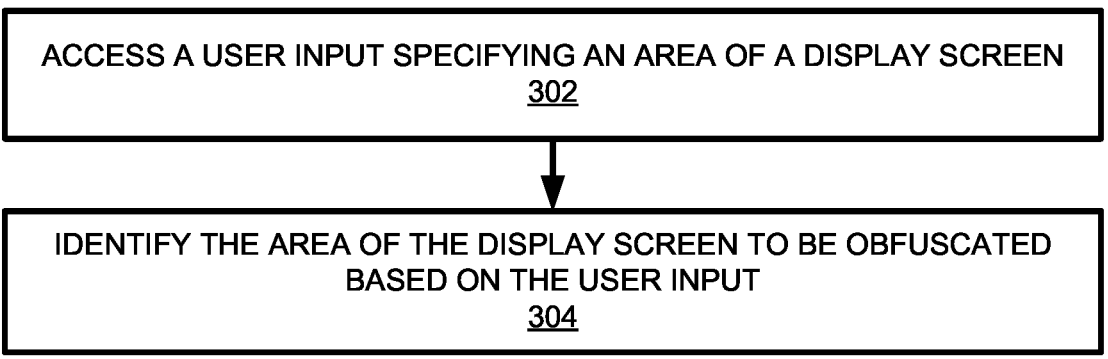
FIG. 3A depicts a flow diagram of an example method for identifying sensitive information based on user input.

FIG. 3A depicts a flow diagram of an example method 300A for identifying sensitive information 203 based on user input. As shown in FIG. 3A, at block 302, the processor 102 may access user input 133 that identifies an area of the display space 201 in which to apply a mosaic. For example, the processor 102 may use the window manager 215 to identify user inputs that draws an area (such as a bounding rectangle or other shape) of the display space 201. Other user inputs such as a selection of a window to identify an area of the display space 201 may be accessed as well. At block 304, the processor 102 may identify a sensitive area that includes sensitive information 203 based on the user input, such as the drawn area (or selected window). As such, a user may directly indicate portions of the display space 201 by drawing (using an input device such as a mouse device or a touch screen device) or identifying areas on the display space 201 to which to apply the mosaic.

Figure 3B:
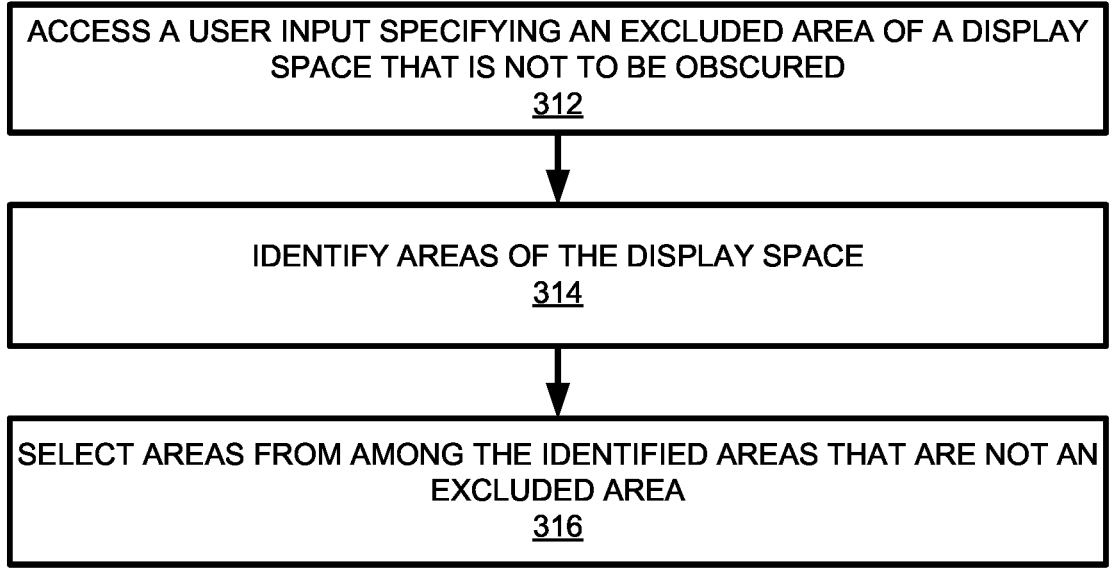
FIG. 3B depicts a flow diagram of an example method for identifying areas of the display space over which a mosaic is to be applied, except for an excluded area specified by user input.

FIG. 3B depicts a flow diagram of an example method 300B for identifying areas of the display space 201 over which a mosaic is to be applied, except for an excluded area specified by user input 133. As shown in FIG. 3B, at block 312, the processor 102 may access user input 133 that indicates an excluded area of the display space 201 that is not to be obscured. In these examples, all other areas, other than the excluded area, of the display space 201 may be obfuscated. The user may intend the excluded area to be included in the recording of the automated test. For example, the user may click on an area of the display space 201 or otherwise input into the replay GUI 220 a name of a window or other area of the display space 201 that is not to be obscured by a mosaic.

At 314, the processor 102 may identify areas of the display space 201. For example, the processor 102 may consult the window manager 215 to identify visual objects displayed in the display space 201. At 316, the processor may select areas from among the identified areas that are not the excluded area. The selected areas may be those areas to which a mosaic is to be applied. To illustrate, the user may wish to obscure all other parts of the display space 201, such as the user's desktop screen, other than the GUI 210 being tested and the replay GUI 220. The processor 102 may identify all windows and other visual objects other than the GUI 210 and the replay GUI 220 and identify areas occupied by the other visual objects, such as the browser 211. The processor 102 may apply a mosaic to the selected areas occupied by the other visual objects.

Figure 3C:
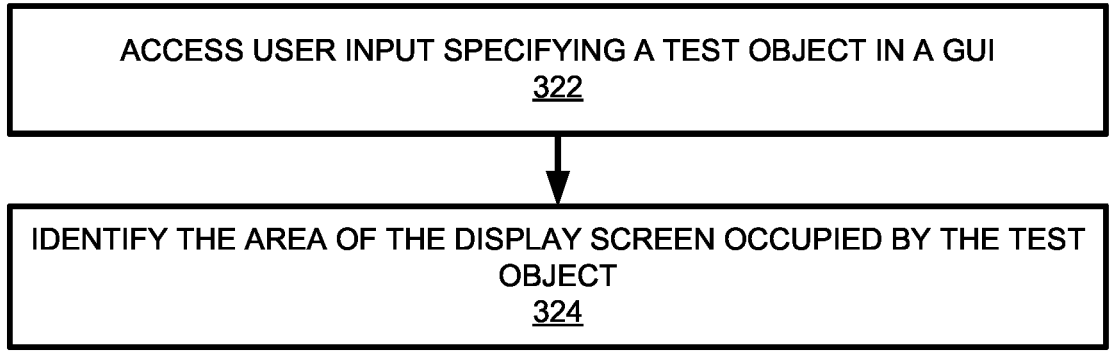
FIG. 3C depicts a flow diagram of an example method for identifying a test object to which to apply the mosaic.

FIG. 3C depicts a flow diagram of an example method 300C for identifying a test object to which to apply the mosaic. The test object may include a control or other object that is part of a visual object such as a GUI. For example, some GUI controls such as text inputs, textboxes, buttons, and so forth, may include sensitive information 203 such as usernames or other personal information. In order to block these and other sensitive information 203 from being discernible in the recording of the automated test, as shown in FIG. 3C, at block 322, the processor 102 may access a user input that specifies a test object in a GUI, such as GUI 210 to be tested. For example, a script may automatically actuate the test object. An example of the script may include: "Browser(XX).Page(YY).WebButton(login).Click:" in which the test object, a login WebButton GUI control from a page named "YY" of a Browser window named "XX," is to be subject to an automated action such as being clicked. The user input may specify that the test object be hidden by a mosaic. The mosaic may be applied to the test object before or after such automated action such as the click.

At block 324, the processor 102 may identify an area of the display space 201 occupied by the test object. In this example, the portion of the snapshot that includes the sensitive information 203 may be identified based on the area of the display space 201 occupied by the test object.

Figure 3D:
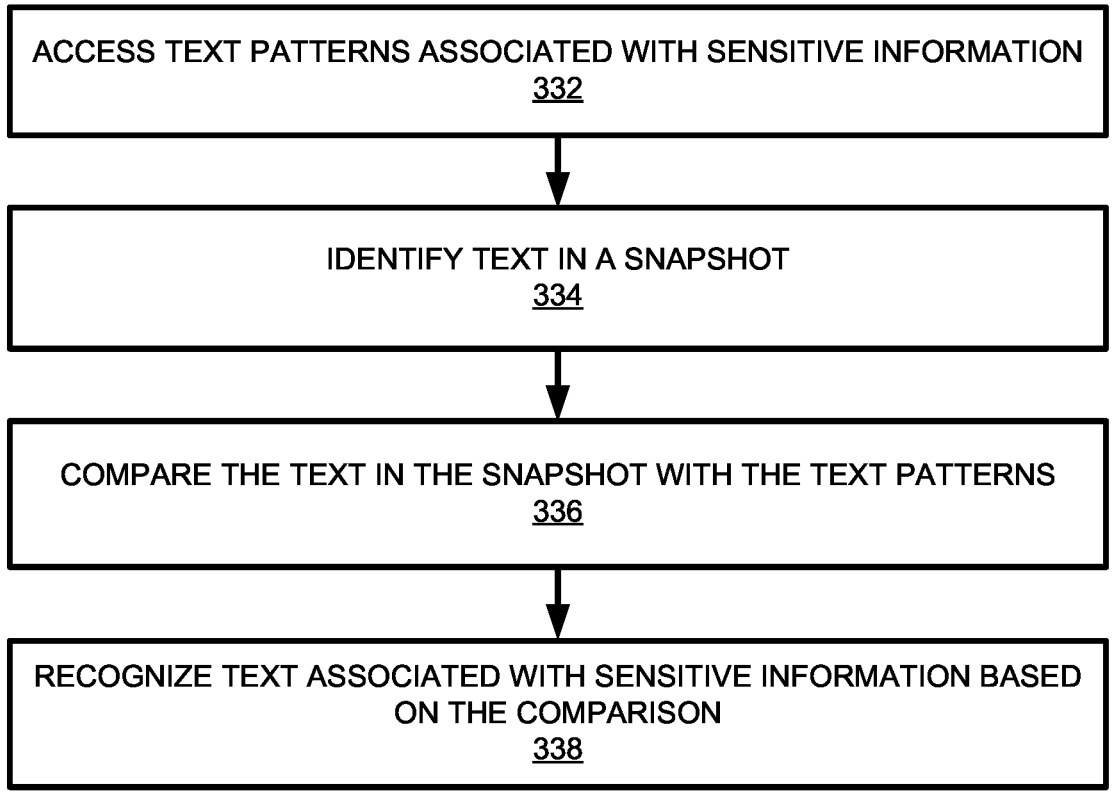
FIG. 3D depicts a flow diagram of an example method for identifying text in the display space that includes sensitive information.

FIG. 3D depicts a flow diagram of an example method 300D for identifying text in the display space 201 that includes sensitive information 203. As shown in FIG. 3D, at block 332, the processor 102 may access text patterns 235 that indicate words or phrases that include sensitive information 203. The text patterns 235 may include regular expressions or other text information or syntax that may be used to identify sensitive information 203. For example, a user replaying the automated test script 207 may consider a URL being browsed in a browser 211 while the automated test is conducted on the GUI 210 to be private. The user may indicate (such as through replay GUI 220) that URLs be considered sensitive information 203. A text pattern 235 may indicate URLs. For example, the text pattern 235 may include a regular expression that is able to parse text to recognize URLs from the text. In particular, the text pattern 235 may include a regular expression "http" followed by a colon, two forward slashes and a wildcard that matches any text that follows the previous regular expression terms. Using this example regular expression, the processor 102 may recognize a URL from text. Other types of regular expressions to recognize other types of URLs may be used as well.

At block 334, the processor 102 may identify text in a snapshot, such as a visual taken of the display space 201 during a replay of the automated test script 207. In some examples, the processor 102 may perform optical character recognition (OCR) analysis on the snapshot to automatically identify the text. At block 336, the processor 102 may compare the text in the snapshot with text patterns 235. For example, the processor 102 may parse the text in the snapshot with a regular expression that is used to identify URLs.

At block 338, the processor 102 may determine that the text includes sensitive information based on the text patterns 235, and identify a portion of the snapshot for which to apply a mosaic. For example, the processor 102 may recognize a URL in text extracted from the snapshot using OCR analysis. The processor 102 may identify a position of the text in the snapshot and determine that a portion of the snapshot corresponding to the position of the text is to have a mosaic applied thereto.

Figure 3E:
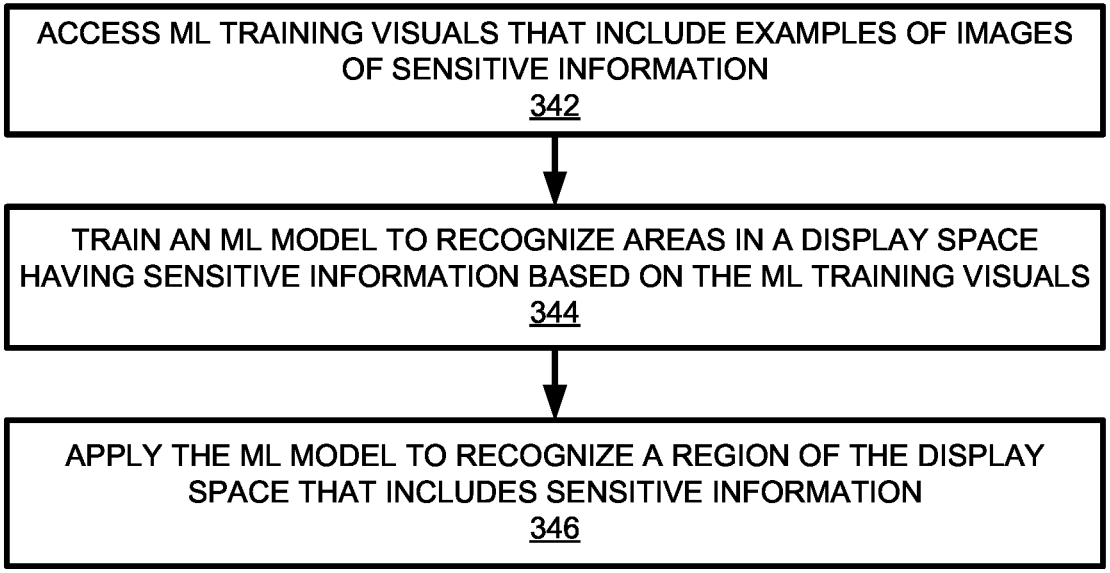
FIG. 3E depicts a flow diagram of an example method for identifying areas in the display space that includes sensitive information based on image recognition analysis, including machine-learning (ML)-based object detection.

FIG. 3E depicts a flow diagram of an example method 300E for identifying areas in the display space 201 that includes sensitive information 203 based on image recognition analysis. The image recognition analysis may include application of ML models trained from ML training visuals 237. For example, as shown in FIG. 3E, at block 342, the processor 102 may access ML training visuals 237 that include examples of images of sensitive information. For example, an ML training visual 237 may include an image of a portion of a display element that includes sensitive information. For example, the ML training visual may include an image of an URL input area of a browser 211. The ML training visuals 237 may include images of different input areas of different browsers 211 from various software vendors. In some examples, an ML training visual 237 may include an image of a body of a browser that displays content of a URL. In some examples, an ML training visual 237 may include an image of an entire window of a browser 211.

Other types of images of areas, or regions, of a display space that may include sensitive information 203 may be included in an ML training visual 237 as well. For example, an image of a search bar provided by an operating system may be included in an ML training visual 237 since search input text may be considered private information. Images of areas that usually include usernames, addresses, or other sensitive information may be included in an ML training visual 237 for training an ML model to recognize areas that include sensitive information.

At block 344, the processor 102 may train an ML model based on the ML training visuals 237 that were accessed at block 342. The ML training visuals 237 may include visuals of areas of display spaces (such as display space 201) that include sensitive information (such as sensitive information 203). These areas of display spaces may also be referred to as "sensitive areas." In some examples, the processor 102 may train the ML model using the training visuals 237 to conduct object detection. The object to be detected may include a sensitive area. In some examples, the object to be detected may include GUI controls that may include a sensitive area. As such, the processor 102 may detect multiple sensitive areas in a given recording of a display space.

In some examples, the object detection technique may include YOLO, YOLO version 2 (YOLOv2), YOLO version 3 (YOLOv3), or other ML object detection techniques. ML training in these examples may include a two-phase approach, in which a classifier network may be trained using the ML training visuals 237. Such training may be performed according to a classifier network such as VGG16, although other classifier networks may be used. In the second phase, the fully connected layers in the classifier network may each be replaced with a convolution layer to generate a convolutional neural network that is retrained with the ML training visuals 237 to create an end-to-end ML model for detecting sensitive areas.

At block 346, the processor 102 may apply the ML model to recognize a region of the display space 201 that includes sensitive information. For example, the processor 102 may input a snapshot that includes a recording of a replay session to the ML model. The processor 102 may execute the ML model to recognize and output various areas on the snapshot that are predicted to include sensitive information (sensitive areas that include the sensitive information) based on the ML training of block 344.

In examples that use trained ML models based on YOLO (and/or its v2 and v3 variants), the processor 102 may divide the snapshot into a set of boxes (such as in a grid configuration). Each box may be input to a set of convolutional layers trained (such as at block 344) to predict class scores and bounding box offsets for bounding boxes that are further divided from an input box of the set of boxes. The ML model may assign a prediction of an object and a confidence score to each of the bounding boxes based on processing through the convolutional layers. The bounding box with the highest confidence score in an input box of the set of boxes may be selected as the representative bounding box for the input box. Thus, the ML model may output, for each input box in the set of boxes (which may be arranged in a grid of boxes), a prediction of the object detected therein and a confidence score for the prediction.

In examples that use object detection techniques, for example, the processor 102 may identify a bounding box in the snapshot that the ML model predicts includes a sensitive area (such as a GUI control or other area of the snapshot of the display space 201). The processor 102 may locate the bounding box in the snapshot. For example, the processor 102 may locate a GUI control, from among various GUI controls, that includes sensitive information at a portion (such as a pixel area or region) of the snapshot and cause a mosaic to be placed at the portion of the snapshot where the GUI control is located. Other portions of the snapshot that include sensitive information may be similarly located.

Regardless of how the processor 102 identifies sensitive areas (or sensitive information) via examples illustrated in FIGS. 3A-3E, the processor 102 may apply a mosaic to the display area of any of sensitive information 203A-N or to an entire window of a display element that includes the sensitive information.

FIG. 4 depicts a flow diagram of an example method 400 for identifying sensitive information in a snapshot of a replay of an automated test of a GUI and applying a mosaic to the snapshot to obfuscate the sensitive information. It should be understood that the method 400 may include additional operations and that some of the operations described therein may be removed and/or modified without departing from the scopes of the method 400. The description of the method 500 is made with reference to the features depicted in FIGS. 1, 2, and 3A-E for purposes of illustration.

As shown in FIG. 4, at block 402, the processor 102 may train an ML model to recognize areas of display spaces that include sensitive information. For example, the processor may train the ML model based on a set of training image data (such as ML training visuals 237) that includes visuals of GUI controls that include the sensitive information. In some examples, the training image data may include images (visuals) of GUI controls that are determined to typically include sensitive information. In these examples, the training image data may be used train the ML model to detect such GUI controls in a snapshot or other visual. In some examples, the training image data may include images (visuals) of URL inputs (such as the URL input area at which URLs may be input for browsing) of web browsers, such as browser 211. In these examples, the training image data may be used train the ML model to detect such URL inputs so as to obfuscate URL addresses of the web browsers. The training image data may include images of other portions (or all) of the browsers as well.

At block 404, the processor 102 may replay an automated test script that recorded a test of a GUI, such as GUI 210, on a display space, such as display space 201. At block 406, the processor 102 may identify, during the replay, an area of the display space that includes the sensitive information based on the ML model. For example, the ML model may detect the GUI controls, URL inputs, and/or other objects that the ML model has been trained to detect using the training image data.

At block 408, the processor 102 may generate a snapshot that includes a visual of the display space. The snapshot may include images of the GUI being test and other objects—including objects that may be unrelated to the automated test—displayed on the display space.

At block 410, the processor 102 may apply a mosaic to the snapshot based on the area of the display space that includes the sensitive information. The mosaic may obscure the area of the display space such that the sensitive information is unreadable or otherwise unrecognizable.

Figure 5:
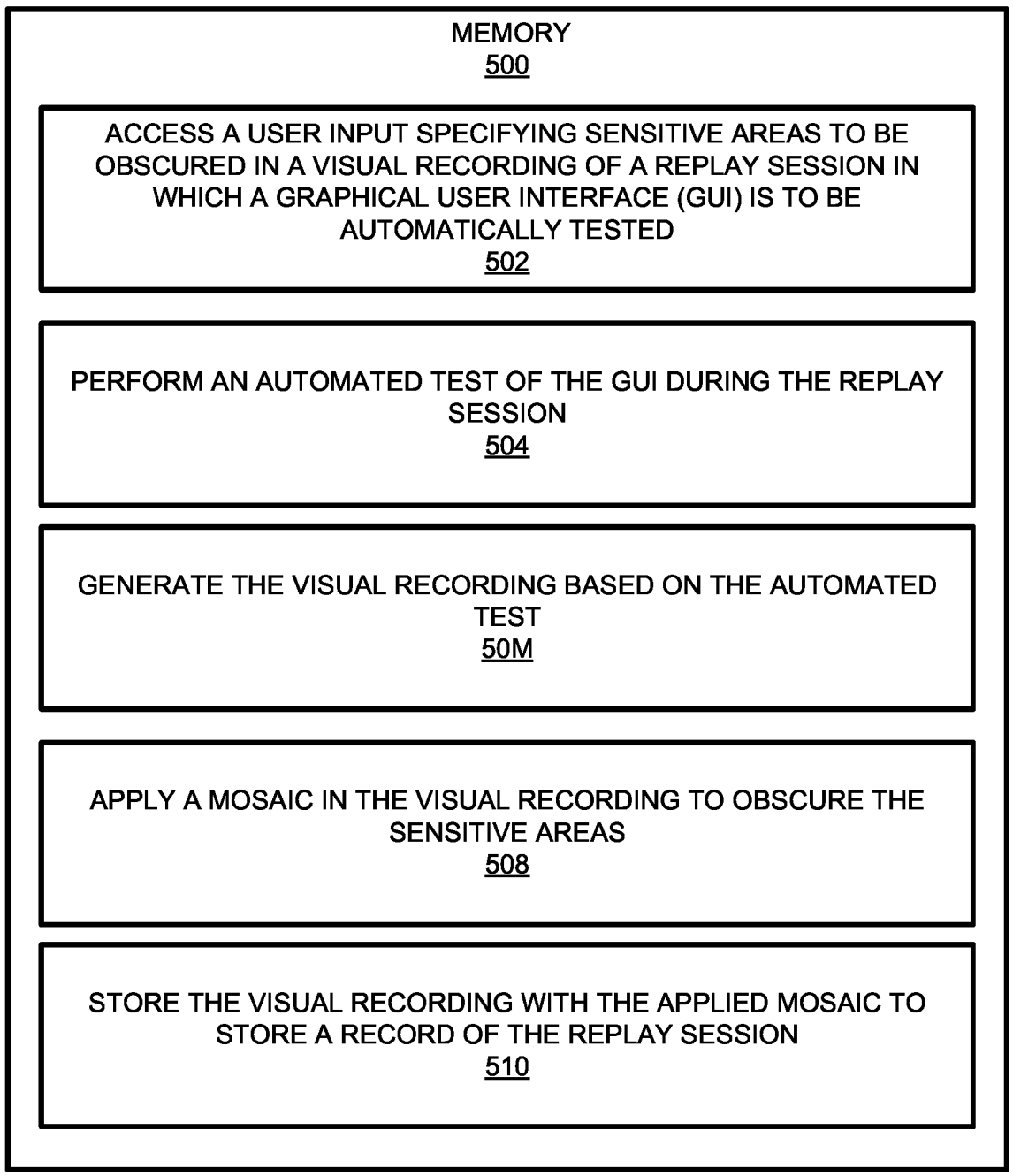
FIG. 5 depicts a block diagram of an example non-transitory machine-readable storage medium for applying a mosaic to user-specified sensitive areas of a GUI for which an automated test is performed.

FIG. 5 depicts a block diagram of an example non-transitory machine-readable storage medium 500 for applying a mosaic to user-specified sensitive areas of a GUI, such as GUI 210, for which an automated test is performed. The non-transitory machine-readable storage medium 500 may be an electronic, magnetic, optical, or other physical storage device that includes or stores executable instructions. The non-transitory machine-readable storage medium 500 may be, for example, Random Access memory (RAM), an Electrically Erasable Programmable Read-Only Memory (EEPROM), a storage device, an optical disc, and the like. The non-transitory machine-readable storage medium 600 may have stored thereon machine-readable instructions 502-510 that a processor, such as the processor 102, may execute.

The machine-readable instructions 502 may cause the processor to access a user input specifying sensitive areas to be obscured in a visual recording of a replay session in which a graphical user interface (GUI) is to be automatically tested. The visual recording may include visuals (images, videos, etc.) as well as non-visual elements such as audio. The input may include an indication of a fixed area of a display space, such as display space 201, in which the GUI is displayed. In some examples, the input may include an indication to apply a mosaic to any area, other than user-indicated areas, of the display space in which the GUI is displayed. The machine-readable instructions 502 may cause the processor to identify an area, other than the user-indicated area, of the display space, and apply the mosaic to the area.

The machine-readable instructions 504 may cause the processor to perform an automated test of the GUI during the replay session. The machine-readable instructions 506 may cause the processor to generate the visual recording based on the automated test. The machine-readable instructions 508 may cause the processor to apply a mosaic in the visual recording to obscure the sensitive areas. The machine-readable instructions 510 may cause the processor to store the visual recording with the applied mosaic to store a record of the replay session.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that, when executed by the processor, are to cause the processor to:
   access an automated test script that was generated based on a recorded test of a graphical user interface (GUI);
   initiate a replay session during which the automated test script is to be replayed to automatically recreate the recorded test within a display space;
   generate a snapshot of the display space during the replay session, the snapshot comprising a visual of the display space;
   training a machine learning model to identify a portion of the snapshot that includes sensitive information;
   executing the replay of the automated test script in a replay session to generate and apply a mosaic to the portion of the snapshot, the mosaic to obscure the sensitive information; and
   save the snapshot having the applied mosaic.

2. The apparatus of claim 1, wherein to identify the portion of the snapshot that includes sensitive information, the processor is further to:
   perform image recognition analysis on the snapshot to automatically identify the portion of the snapshot.

3. The apparatus of claim 2, wherein to perform image recognition analysis on the snapshot, the processor is further to:

apply the machine learning model that identifies GUI controls that have the sensitive information to identify a location of a GUI control, among the GUI controls, in the snapshot, wherein the portion of the snapshot is identified based on the location of the GUI control in the snapshot.

4. The apparatus of claim 2, wherein to perform image recognition analysis on the snapshot, the processor is further to:
apply the machine learning model to determine a region of the display space that has the sensitive information, wherein the portion of the snapshot is identified based on the determined region of the display space that has the sensitive information.

5. The apparatus of claim 1, wherein to identify the portion of the snapshot that includes sensitive information, the processor is further to:
perform optical character recognition analysis on the snapshot to automatically identify the portion of the snapshot.

6. The apparatus of claim 5, wherein to perform optical character recognition analysis on the snapshot, the processor is further to:
recognize text that is associated with the sensitive information.

7. The apparatus of claim 1, wherein to identify the portion of the snapshot that includes sensitive information, the processor is further to:
access a user input that indicates an area of the display space that is to be obscured.

8. The apparatus of claim 1, wherein to identify the portion of the snapshot that includes sensitive information, the processor is further to:
access a user input that indicates excluded areas of the display space that are not to be obscured; and
identify an area of the display space other than the excluded areas, wherein the portion of the snapshot that is to be obscured is identified based on the area of the display space other than the excluded areas.

9. The apparatus of claim 8, wherein the area of the display space other than the excluded areas includes display elements not part of the GUI and not part of a replay GUI used to control recording a replay of the automated test script.

10. The apparatus of claim 1, wherein to identify the portion of the snapshot that includes sensitive information, the processor is further to:
access a user input that specifies a test object in the GUI to be tested; and
identify an area of the display space occupied by the test object, wherein the portion of the snapshot that includes the sensitive information is identified based on the area of the display space occupied by the test object.

11. The apparatus of claim 1, wherein the applied mosaic comprises a screen element overlaid onto the portion of the snapshot or a modification to the portion of the snapshot.

12. The apparatus of claim 1, wherein the visual comprises a video or still image.

13. The apparatus of claim 1, wherein the applied mosaic is applied throughout a duration of the replay session.

14. A computer-implemented method comprising:
training, by a processor, a machine learning (ML) model to recognize areas of display spaces that include sensitive information;
replaying, by the processor, an automated test script that recorded a test of a graphical user interface (GUI) on a display space;
identifying, by the processor during the replaying, an area of the display space that includes the sensitive information based on the ML model;
executing, by the processor, the automated test script to generating, by the processor, a snapshot that includes a visual of the display space;
automatically testing and recording, by the processor, the test of the graphical user interface (GUI) on the display space; and
applying, by the processor, a mosaic to the snapshot based on the area of the display space that includes the sensitive information.

15. The method of claim 14, wherein training the ML model comprises: training the ML model based on a set of training image data comprising visuals of GUI controls that include the sensitive information.

16. The method of claim 14, wherein training the ML model comprises: training the ML model based on a set of training image data comprising visuals of uniform resource locator (URL) inputs of web browsers, wherein the sensitive information comprises a URL within a web browser.

17. A non-transitory computer readable medium on which is stored machine readable instructions that, when executed by a processor, cause the processor to:
access a user input specifying sensitive areas to be obscured in a visual recording of a replay session in which a graphical user interface (GUI) is to be automatically tested and generate a snapshot during the replay session;
training a machine learning model to identify a portion of the snapshot that includes sensitive areas;
perform an automated test of the GUI during the replay session;
executing the replay of the automated test in a replay session to generate the visual recording based on the automated test;
recording the snapshot to generate and apply a mosaic in the visual recording to obscure the sensitive areas; and
store the visual recording with the applied mosaic to store a record of the replay session.

18. The non-transitory computer readable medium of claim 17, wherein to access the user input, the machine readable instructions, when executed, further cause the processor to:
access an indication of a fixed area of a display space in which the GUI is displayed; and
generate the mosaic to obscure the fixed area of the display space.

19. The non-transitory computer readable medium of claim 17, wherein to access the user input, the machine readable instructions, when executed, further cause the processor to:
access an indication to apply the mosaic to any area, other than user-indicated areas, of a display space in which the GUI is displayed;
identify an area, other than the user-indicated area, of the display space; and
apply the mosaic to the area.

20. The non-transitory computer readable medium of claim 17, wherein to access the user input, the machine readable instructions, when executed, further cause the processor to:
access an indication to apply the mosaic to a user-specified GUI control; and
identify an area of a display space occupied by the user-specified GUI control, wherein the mosaic is applied to the area of the display space occupied by the user-specified GUI control.

* * * * *